(12) United States Patent
Choy et al.

(10) Patent No.: US 7,043,490 B2
(45) Date of Patent: May 9, 2006

(54) METHOD, SYSTEM, AND PROGRAM PRODUCT TO SUPPORT MULTIPLE CONTENT-MANAGEMENT DATA MODELS

(75) Inventors: David M. Choy, Los Altos, CA (US); Tawei Hu, San Jose, CA (US); Lily Liang, San Jose, CA (US); Kenneth C. Nelson, Hollister, CA (US); Randal J. Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/091,919

(22) Filed: Mar. 5, 2002

(65) Prior Publication Data

US 2003/0172049 A1 Sep. 11, 2003

(51) Int. Cl.
*G06F 17/30* (2006.01)
*G06F 7/00* (2006.01)

(52) U.S. Cl. .................... 707/101; 707/102; 707/104.1; 707/10

(58) Field of Classification Search .................... 707/1, 707/2, 103 R, 101, 102, 104.1, 10; 715/513
See application file for complete search history.

(56) References Cited

U.S. PATENT DOCUMENTS

| | | | |
|---|---|---|---|
| 5,799,310 A | | 8/1998 | Anderson et al. |
| 5,907,846 A | * | 5/1999 | Berner et al. ........... 707/103 R |
| 5,913,205 A | * | 6/1999 | Jain et al. ...................... 707/2 |
| 6,047,291 A | | 4/2000 | Anderson et al. |
| 6,078,926 A | * | 6/2000 | Jensen et al. ........... 707/103 R |
| 6,233,586 B1 | | 5/2001 | Chang et al. |
| 6,263,342 B1 | | 7/2001 | Chang et al. |
| 6,272,488 B1 | | 8/2001 | Chang et al. |
| 6,405,205 B1 | * | 6/2002 | Hakuba ...................... 707/101 |
| 6,647,396 B1 | * | 11/2003 | Parnell et al. .............. 707/102 |
| 6,732,331 B1 | * | 5/2004 | Alexander .................. 715/513 |
| 2001/0052032 A1 | * | 12/2001 | Williamson et al. ........ 709/315 |

FOREIGN PATENT DOCUMENTS

| | | |
|---|---|---|
| WO | WO 00/45294 A1 | 8/2000 |
| WO | WO 02/01384 A2 | 1/2002 |

OTHER PUBLICATIONS

PCT Search Report.

* cited by examiner

*Primary Examiner*—Greta Robinson
*Assistant Examiner*—Kuen S. Lu
(74) *Attorney, Agent, or Firm*—Sughrue Mion, PLLC

(57) ABSTRACT

Methods, systems, and program products for managing multimedia content. These are built upon a combination of a high level content model for specific multimedia content types and a low level physical for mapping to a data engine. The method, system, and program product include representing multimedia content management objects and managing the objects in a relational database. The relational database is adapted for representing data in a plurality of relational database tables, where each of the relational database tables has at least one row with a plurality of columns. Content is managed by associating the object as an item to a row in a first relational database table; and associating additional components, if any, of the object to additional relational database tables.

41 Claims, 4 Drawing Sheets

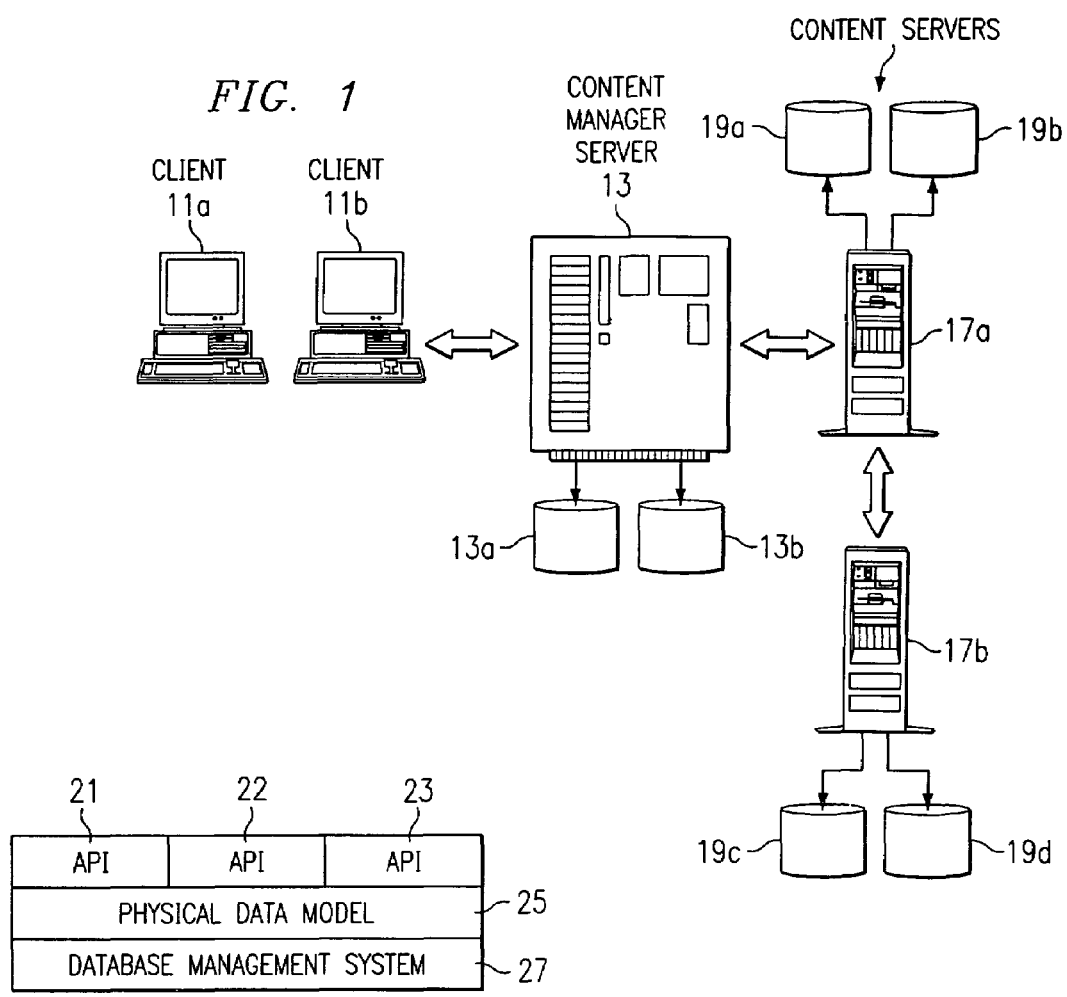
FIG. 1
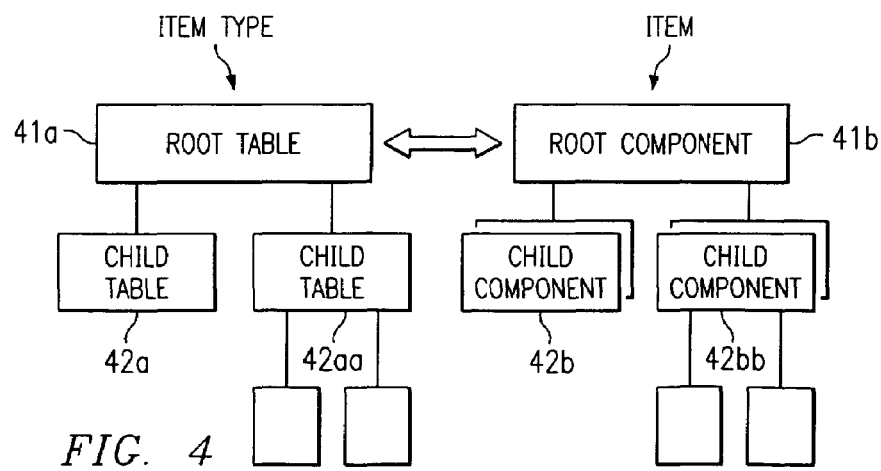
FIG. 2
FIG. 4

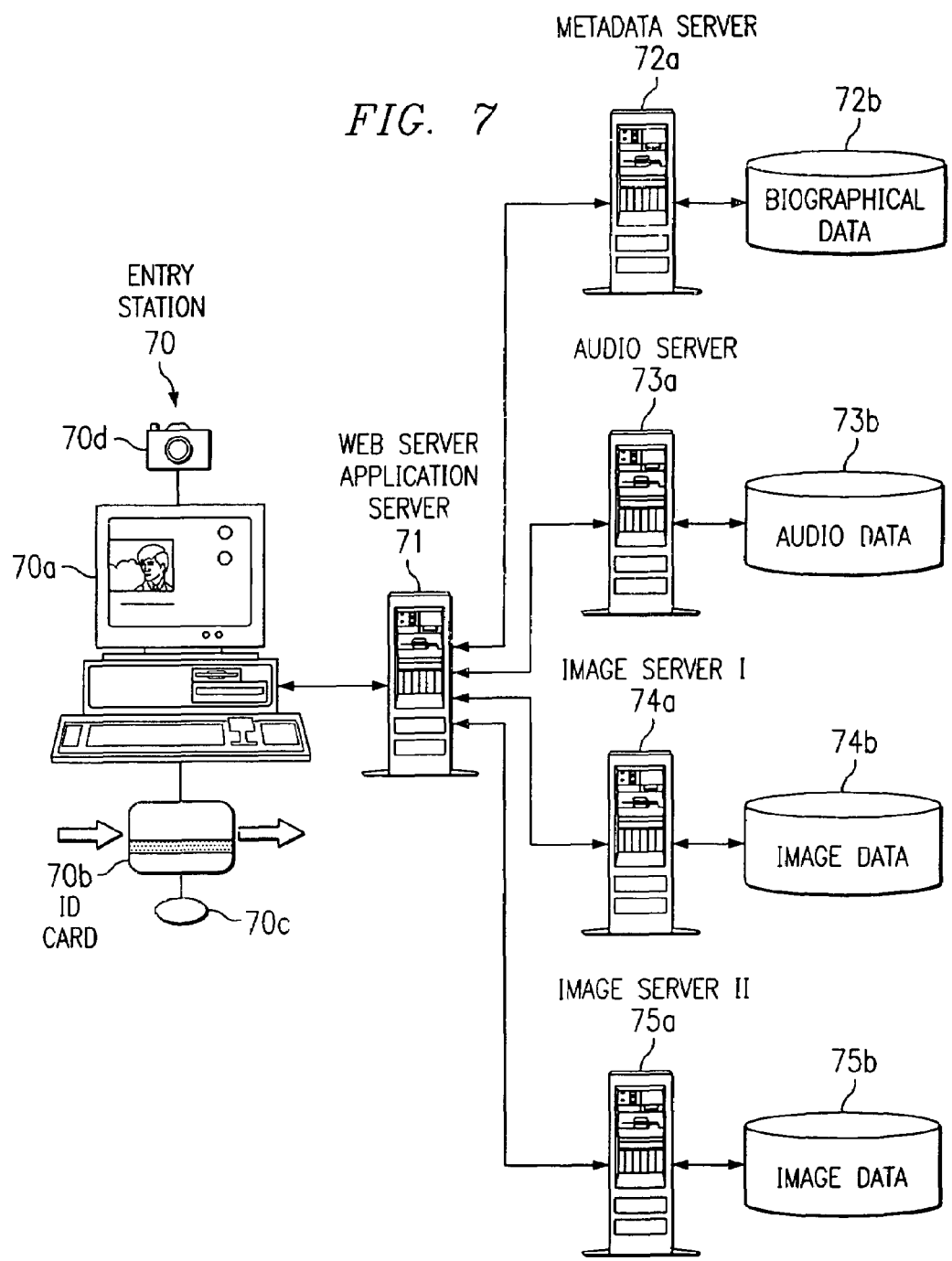

METHOD, SYSTEM, AND PROGRAM PRODUCT TO SUPPORT MULTIPLE CONTENT-MANAGEMENT DATA MODELS

FIELD OF THE INVENTION

Our invention relates to data structure models, including multimedia data structure models, and facilitates access, retrieval, and data conversion for content management applications. Our invention further relates to the use of the data structure model, to systems utilizing the data structure model, and to program products incorporating the data structure model. Further aspects of our invention further relate to a tool kit, tool set, or wizard that enables an end user to create a hierarchy of RDBMS tables to implement the model, that is, by pointing to or linking various disparate data models and their RDBMS representations. The data structure model is used for organizing, inter-relating, and accessing data and files, including relational, network, hierarchical, and entity-relationship models, and graphics, text, and web page files, among others.

BACKGROUND OF THE INVENTION

Multimedia data management and delivery is a complex, computer and memory intensive, task. As used herein, "multimedia" data refers to combinations of sound, graphics, animation, text, and video data, which may be linked in an associative system of storage and retrieval, which may be interactive, and which may be linked to other media.

A multimedia content management system needs to manage a large volume of disparate data, including unstructured data as well as structured data. The structured data often include "metadata" that describe the unstructured data so that the latter can be organized, grouped and correlated in various ways, searched, retrieved, and administered. Within a content management system, a relational database management system (RDBMS) is often used to manage these structured data so that off-the-shelf RDBMS data management technologies can be leveraged. However, the type of the unstructured data, that is, multimedia content, differs from application to application.

Because the type of data (including its schema, metadata, applicable extenders, and the like) differs between applications and content data models (as streaming, graphical, visual, video, audio, text, numeric), a different database design is needed to support the metadata and schema database of each application and data model. Heretofore, it was not possible to support different content management applications using different content data models with a single, general-purpose content management system. Such a system could not have a pre-designed, i.e., "one size fits all," database management system. Rather, the content management system must have been provided with the capability of allowing an application developer to describe the required structured data so that a database with a suitable design could be created for that application. This description was normally expressed in the abstraction of a high-level data model supported by the content management system, usually through an application programming interface (API) or a graphical user interface (GUI). While this high-level data model provided the flexibility to support more than one application, it also limited the coverage to only those applications that could be expressed in that particular high level model.

The data model is an essential aspect of a content management system because it determines the potential capability of the system as well as its limitations. However, while a data model can sometimes be expanded somewhat, such an expansion is usually very limited and will not be able to capture a different paradigm, especially one with an incompatible or even conflicting concept.

Thus, a clear need exists for an extensible and scalable data model that readily supports a wide range of disparate content data models, and which can be readily implemented in a system or program product.

A further need exists for a tool, tool kit, tool set, or wizard to create and populate a relational database of disparate content schema and metadata, for an extensible and scalable content management RDBMS.

SUMMARY OF THE INVENTION

This is accomplished by the methods, systems, and program products for managing multimedia content of our invention. The method, system, and program product of our invention utilize a low level physical content model that is able to support a plurality of high level content models to meet a diverse and open set of content application requirements. The low level physical model of the data content is extensible to new technologies, and new standards, and to satisfy new requirements, through the addition of additional, new, high level data models. It also provides efficient mapping to the data engine (a database management system, as a relational database management system or an object oriented database management system, or an XML data repository, all by way of example and not limitation).

Exemplifications of the method, system, and program product of the invention include representing multimedia content management objects in the low level physical model and managing the objects in a relational database. The relational database is adapted for representing data in one or more relational database tables, where each of the relational database tables has at least one row with a plurality of columns. Content is managed by associating the object as an item to a row in a first relational database table, and additional rows, if any, in additional tables.

The invention includes a method of representing a multimedia content management object in a relational database adapted for representing multimedia content management data in one or more relational database tables, and a method, system, and program product for managing the multimedia content database management system. Each of the relational database tables has at least one row with a plurality of columns. The method associates the object as an item to a row in a first relational database table, and additional rows, if any, in additional tables. Any columns of these tables may contain pointers to other items or to non-structured content resources.

THE FIGURES

The invention is illustrated in the FIGURES attached hereto.

FIG. 1 illustrates a multimedia database system with multiple clients, a content management server, and multiple content servers.

FIG. 2 illustrates the layered structure of the method, system, and program product of the invention, with a structure of the API's as high level data models, a generic, low level infrastructure as the physical data model, and the underlying Relational Database Management System.

FIG. 4 illustrates a side-by-side mapping of an Item type, including the root table, child tables, and grand child tables, mapped to an Item, as an instance of the Item type, including the root components, child components, and grand child components. Each component is a row in the corresponding tables.

FIG. 7 illustrates a personal identification application having multimedia content stored at various servers for use at a terminal, for example in a security system.

DETAILED DESCRIPTION OF THE INVENTION

Figure 3:
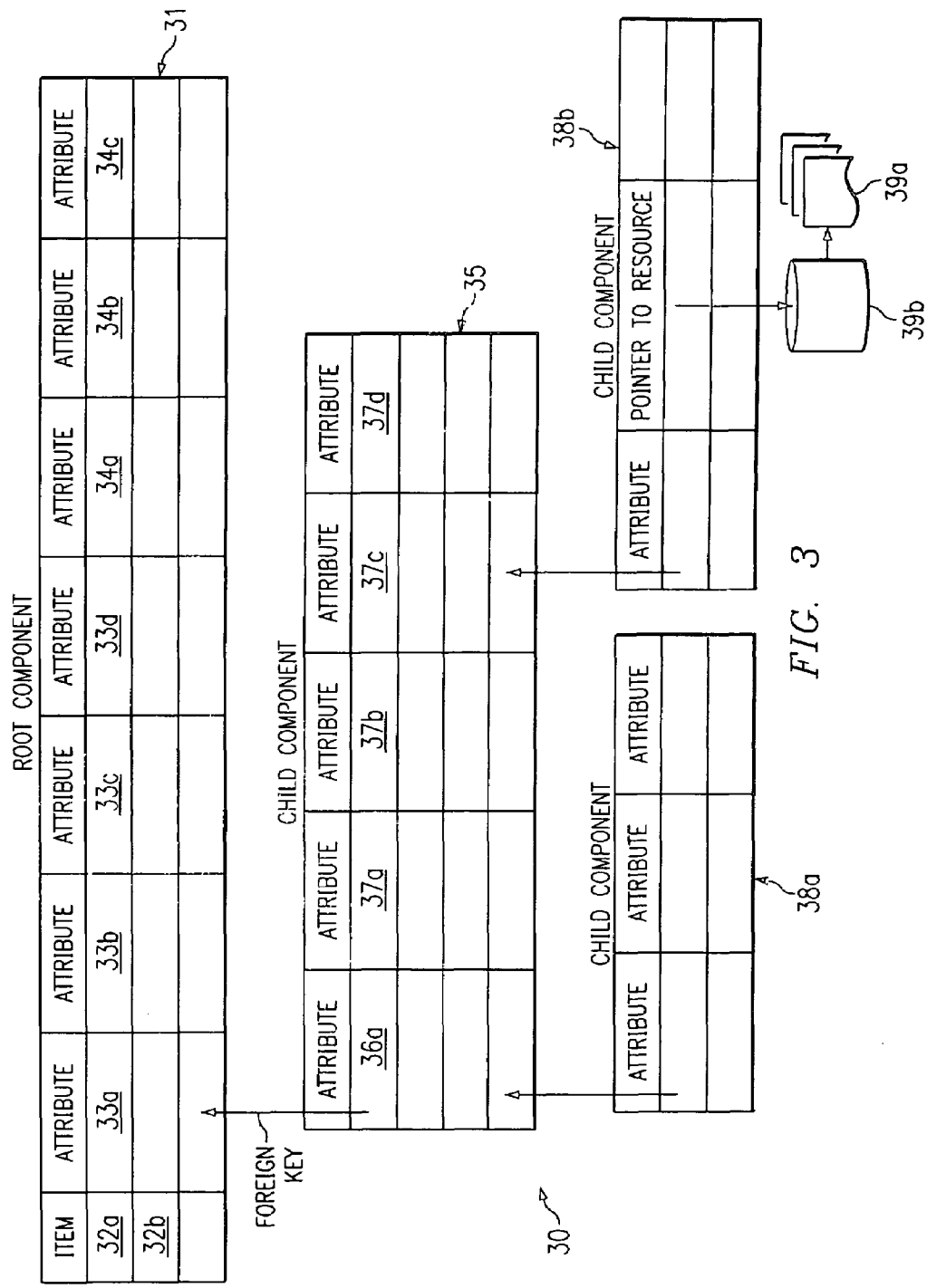
FIG. 3 illustrates a simplified overview of a Relational Database Management System of the invention showing hierarchal RDBMS tables including an Item Table with a row for the root component and including component and attribute cells (columns), component tables with sub-component and attribute cells (columns), and grandchild tables for both sub-components and attributes, with suitable pointers.

As shown in FIG. 1, a multimedia system is a complex client-server system with multiple clients, 11a, 11b, a server, 13, and one or more content servers, 17a, 17b, each with one or more content stores, 19a, 19b, 19c, 19d. It should be noted that the content stores may contain structured data, such as metadata for content, or unstructured data, such as textual data, image data, streaming audio, or streaming video. These data may be, and typically are, in a variety of disparate formats.

The server, 13, which may include a web server, also includes the content manager server. The content manager server is the repository of the content management RDBMS described herein. To be noted is that while we illustrate our invention with respect to relational database management systems, the method, system, and program product of our invention are also applicable to, for example, object oriented database management systems and XML data repositories.

To accommodate more than one content data model in a high-level data model, we provide an extensible content management system such that a user can introduce appropriate metadata and schema and new APIs to support new high-level data models. This extensibility is enabled by an architecture that is built around a low-level infrastructure supporting a physical data model and implemented through a hierarchical structure of RDBMS tables of content and content metadata, as items, components, sub-components, and attributes, with corresponding rows and columns (attributes) within the rows. The architecture and an associated infrastructure and physical data model are used as building blocks to support high-level data models. This physical data model is independent of application-specific semantics, maps directly and efficiently to a relational database designed to exploit RDBMS capabilities, and can be enriched over time to expand its functions and/or to exploit new RDBMS capabilities.

The design point for this physical data model is different from that of a high-level data model exposed to an application developer. The high-level data model focuses heavily on its logical aspects (its usability and expressiveness with respect to a class of applications), whereas the physical data model focuses heavily on its physical aspects (storage access efficiency and ability to exploit RDBMS capabilities) to provide generic, basic functions broadly useful to many content management applications. This physical data model, or any part of it, may or may not be exposed to user through a high-level data model.

Conceptually, as shown in FIG. 2, the method, system, and program product of our invention utilize a high level content model that is able to support a diverse and open set of content application requirements and a plurality of high level data models, and a low level physical model of the data content that is extensible to accommodate new technologies, new standards, and new requirements and provides efficient mapping to the data engine (a database management system, as a relational database management system or an object oriented database management system, by way of example and not limitation). To be noted is that each high level data model is in the form of an Application Program Interface (API) embodying a representation of data structure and constraints. Also to be noted is that the low level data model or infrastructure, 25, can support multiple high level models, 21, 22, 23. The extensible and scalable content management system of the invention contains one or more APIs supporting disparate high level data models, 21, 22, 23, supported by a generic, low level infrastructure, 25, that is, a physical data model, which in turn is supported by the Relational Database Management System (RDBMS), 27.

FIGS. 3, 4, 5, and 6 illustrate the relationships between the physical model and its representation in a RDBMS environment. In a relational database data is represented as tables. The building blocks of a relational database table are tables of rows and columns (attributes). Specifically, a table consists of a row of column headings together with zero or more rows of data values. For a given table (1) the column heading specifies one or more columns, and (2) each data row contains exactly one value (or a null value) for each one of the columns specified in the column heading row.

The primary, standalone unit of content managed by the physical layer of the content management system of the invention is an "Item." FIG. 3 shows an Item Database, 30, with a root component, 31, having Item Rows, 32a and 32b. An item consists of a typed hierarchical structure of components, 35, and one or more levels of sub-components, 38a, 38b, with attributes 33a, 33b, 33c, 33d, 34a, 34b, 34c, and has a unique identifier "ItemID".

Each component, 35, contains a reference, 36a, to the parent component. The reference is through a foreign key.

The Sub-component tables, 38a and 38b, may reference further sub-components or attributes. The sub component table, 38b, is illustrated as referencing pointers to content data repositories, 39a, and 39b.

FIG. 4 represents a more general, higher level view of the model shown in FIG. 3. Through the high-level data model, or within an application, an "Item," that is, a multimedia content management object item, can be used to represent a real object, as a document, a folder, a media asset, or other real-world content entity. FIG. 4 illustrates a mapping of hierarchal physical items and attributes thereof, 41b, on the right, to hierarchal RDBMS representation, that is, RDBMS Item Types, 41a, on the left. An "ItemType," is a user defined schema and a named hierarchical structure of RDBMS tables, each of which is called a "ComponentType," 35, of the "ItemType." Each "ComponentType" contains user-specified attribute(s) as well as certain system attributes.

A user-specified attribute can be of any data model supported by the RDBMS, or can be of a special data model supported by the content management system. An "Item" logically consists of a row in the root table of the respective "ItemType," and any number of rows in each child table of the "ItemType," with a condition that the parent of a child row contained in an "Item" must also be contained in the "Item." An "Item" is a hierarchy of rows that are stored in a hierarchy of tables. Each of these rows is called a "Component" of the "Item" and has a "ComponentID" that uniquely identifies the "Component" within the respective "ComponentType."

Cardinality constraints can be defined for each child "ComponentType" to assure a minimum and/or a maximum number of rows of that type under each of their parent rows. The default minimum is zero and the default maximum is infinity. An "ItemType" can also be ordered or unordered. For an "Item" of an ordered "ItemType," the child rows under each parent row are ordered, and the ordering is maintained by the system.

An "ItemType" can be versioned. If so, multiple versions of an "Item" are maintained for every "Item" in the "ItemType." They share the same "ItemID" but each has a different version number. The number of latest versions to be retained for an "Item" can be specified for each versioned "ItemType." The default is infinity, i.e., no automatic purging of old versions will be performed by the system.

In one preferred embodiment, the parent-child relationship between two "ComponentTypes" within an "ItemType" is maintained by a RDBMS Foreign Key created in the child "ComponentType" (or sub-component) referencing the parent "ComponentType." Thus, the referential integrity of each child "Component" (or sub-component) to its parent "Component" is assured by the RDBMS. In this embodiment, each "Component" in an "Item" contains at least the following system attributes: "ItemID", "ComponentID", and ParentID, and optionally may contain an "Item" VersionNumber, and ACL Code (Access Control List code). Although "ItemID", "Item" VersionNumber, and ACL Code are only needed for the root "Component," they may be included in every "Component" to facilitate access. Other system attributes can also be included to facilitate access or maintenance, e.g., "ComponentType," the number of immediate child Components underneath a "Component," etc. Also a separate RDBMS table is created for each "ComponentType" defined for an "ItemType;" i.e., tables are not shared between two "ItemTypes". This design simplifies the logic and also enhances database scalability. In a different embodiment, a table can be shared among several "ItemTypes" to store Components (rows) of similarly defined ComponentTypes for these several "ItemTypes". In this case, including "ItemType" as a system attribute in this shared table can facilitate access. Sharing a table in this manner allows a faster search when the search scope covers multiple "ItemTypes" that contain common attribute(s) being searched on.

Figure 5:
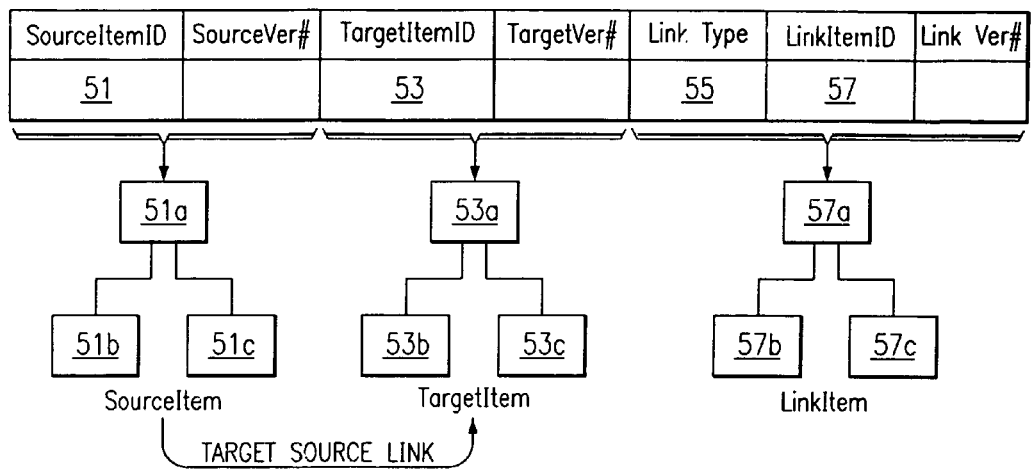
FIG. 5 illustrates a row in a Relational Database Management System table, relating source items, target items, and link items.

As illustrated in FIG. 5, Items (including Child Components, Grand Child Components and Attributes) can relate to or be associated with each other, for example through a system table, using Links. A Link is an "external" relationship that binds a source "Item," 51, to a target "Item," 53, along with a LinkType, 55, and an optional Link "Item," 57. This relationship is "external" since it is not imbedded in either the source or the target "Item." The LinkType is a categorization label so that an application can selectively traverse, or search on, Links of a particular type. A Link "Item" is a third "Item" that can be used to describe this relationship if needed. Links can be used to support one-to-many and many-to-many relationships, including aggregation and containment relationships.

The semantics of each relationship are defined by a high-level data model. One example is "foldering", in which case an "Item" representing a folder is Linked to the Items (representing documents or other folders) that are "contained" in this folder. For example, Source Item 51, acts as a container for Target Item, 53. The binding of a Link to the source or the target "Item" can be either version-specific or version-independent. The former binds a specific version of an Item, whereas the latter binds to any/all versions of an "Item." In one embodiment, Links are maintained as rows in one or more dedicated RDBMS tables containing at least the following attributes: source "ItemID", source "Item" VersionNumber, target "ItemID", target "Item" VersionNumber, LinkType, Link "ItemID", and Link "Item" VersionNumber.

Figure 6:
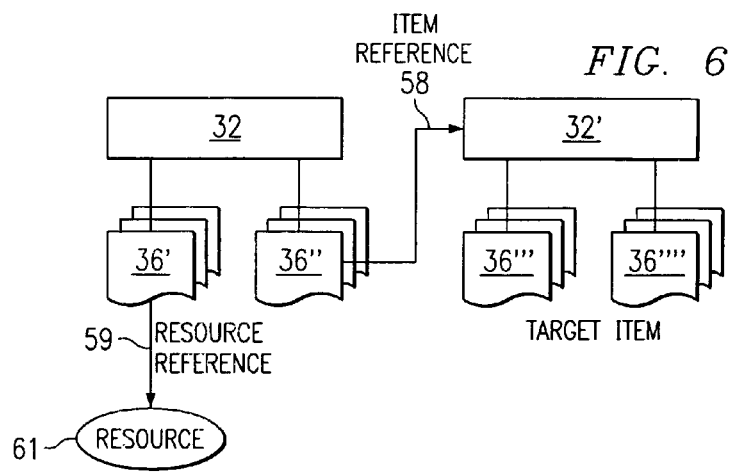
FIG. 6 illustrates the application of resource references to target items.

As illustrated in FIG. 6, items can also relate to each other using "Item Reference" attributes, which are maintained like other attributes contained in an "Item." An "Item Reference" attribute is a user-defined attribute created as a part of a "ComponentType," 36, within an "ItemType," 32. This attribute has a special data model maintained by the content management system. It contains a reference, 58, that points to a target "Item," 32'. Similar to a Link, (FIG. 5) the binding of the reference, 58, to the target "Item," 32', can be either version-specific or version independent. When an "Item Reference," 58, attribute is specified, a Scope of Reference and a Delete Semantics are defined for the referenced Items. The scope specifies which "ItemType" (s) the referenced Items can belong to, whereas the delete semantics are similar to the delete rules maintained by a RDBMS to assure referential integrity when a referenced "Item" is to be deleted. An "Item Reference" attribute, 58, can also be unscoped, in which case a referenced "Item" can belong to any "ItemType." In a preferred embodiment, a homogeneously scoped "Item Reference" attribute (i.e., when the scope is a single "ItemType") is supported by a RDBMS Foreign Key. Heterogeneously scoped (i.e., when the scope includes multiple "Item" Types) and unscoped "Item Reference" attributes are maintained by the content management system using RDBMS triggers.

Another special data model supported by this physical data model is that of a Resource Reference attribute, 59, also illustrated in FIG. 6. As illustrated in FIG. 6, a Resource Reference, 59, contains a reference to a Resource, 61, managed by a Resource Manager of the content management system. A Resource Manager is a special-purpose server that manages resources of a particular type. Examples are an Object Server, which manages a large volume of binary objects, and a Stream Server, which manages and delivers streaming objects (e.g., audio and video content). The extensible content management system in our design is able to accommodate new Resource Managers, each of which is specially designed to manage a specific type of resources, with its specific representation and methods that are not necessarily modeled by the physical data model described here. The unstructured data managed by the content management system are largely managed internally by one or more of these Resource Managers. The integrity of a Resource Reference is maintained by the content management system.

The physical data model described herein is able to support a wide range of high-level data models to cover a diverse spectrum of application domains, as well as to support many industry standards (e.g., Dublin Core, XML). Equally important, this physical data model also provides enough flexibility to allow database optimization so as to support high-level data models efficiently. In one example, a high-level data model uses Items of one "ItemType" to represent standalone, sharable images, each of which has its own attributes, versions, and ACL. The actual images are stored as Resources. Items of another "ItemType" are then used to represent documents, and Links are used to bind each document to the images it contains. In another example, to support a high-performance production application, a single "Item" is used to represent a document together with the images contained in the document. (The actual images are also stored as Resources.) In this case, performance is critical but there is no sharing requirement for the images.

"ItemView(s)" can be defined on an "ItemType." An "ItemView" is a named template to restrict access to an "ItemType" to certain "Component" tables and attributes. It is essentially a set of RDBMS views for the corresponding "Component" tables in the "ItemType."

One exemplification of the invention is a multimedia distributed database management system with distributed card reader access, for example, as would be used in a magnetic card security system, a credit card or debit card or automatic teller machine card system, or an airline frequent traveler system. One version of this system is shown in FIG. 7. The system, 70, is actuated by identification indicia, e.g., encrypted data, on a magnetic or optical card, 70b, read by a card reader 70a.

After reading the card, 70b, biometric readings are taken. Exemplary biometric data includes fingerprints at finger print reader 70c, voice prints and samples, facial images, and eye images, at digital camera, 70d, among others. The biographical, audio, and image data are typically accessed through and processed by separate servers 72a, 73a, 74a, and 75a, and stored in separate databases, 72b, 73b, 74b, and 75b, for example, fingerprint data, voice data, and facial and eye image data are stored as multimedia data objects on separate fingerprint data, voice data, and facial and eye image databases, with such attributes as data models (images, mathematical representations of image data, audio data, and mathematical representations of audio data), as well as repository addresses (e.g., URL's or IP addresses), where the data is the item and the addresses and definitions of data models are the attributes, and the image presented to the screener, security guard, cashier, boarding agent, or enforcement professional is the resource.

The method and system are physically implemented in a program product. The program product may reside on one computer or on several computers or on a distribution server or a disk or disks or tapes. The program itself may be encrypted and/or compressed, as would be the case of distribution media or a distribution server, for example, before installation or it may be installed on the one or more computers.

A further aspect of the invention is a method and program product in the nature of a wizard (that is, a structured series of dialogs that ask questions and use the answers or choices to produce a result ) for populating the multimedia content management system with content schema and metadata, including high level content models and low level physical models. This is accomplished by presenting a query to a user as to a content item, and, based upon the end user's response, presenting one or more subsequent queries as to the content item, and based upon the responses, determining the subcomponents and attributes of the item.

While the invention has been described with respect to certain preferred embodiments and exemplifications, it is not intended to e limited thereby, but solely by the claims appended hereto.

We claim:

1. A method of representing a multimedia content management object as an item in a relational database adapted for representing multimedia content management data in one or more relational database tables, each of said relational database tables having at least one row with a plurality of columns, said method comprising:

associating a root component of the content management object with a row in a first relational database table;

associating attributes of the root component with corresponding columns of the first relational database table;

associating additional components of the content management object, if any, with rows in additional relational database tables; and using the item defined by the relational database tables to construct a plurality of high level content management data models, each corresponding to a different application.

2. The method of claim 1, wherein each of the additional components comprises a child component of a root component or a child component of another component.

3. The method of claim 2, further comprising using a foreign key in a child component to reference its parent component.

4. The method of claim 1, wherein an attribute comprises a pointer to a data resource stored in a separate repository.

5. The method of claim 1, wherein an attribute comprises a pointer to another content management object.

6. The method of claim 1, wherein a row in a table comprises a link between a source item and a target item.

7. A method of representing a multimedia content management object in a database comprising a high level content model and a low level physical model of multimedia content data, said low level physical model providing a mapping to a data engine, said method comprising:

a. entering multimedia content data metadata and schema in the low level physical model, and b. mapping the metadata and schema to the data engine, wherein the low level physical model supports a plurality of high level content models, and wherein the high level content models each corresponds to a different application.

8. The method of claim 7, wherein the high level content model comprises an application program interface embodying a representation of one or more data structures and constraints.

9. The method of claim 7, wherein the high level content model supports a plurality of content application requirements.

10. The method of claim 7, wherein the low level physical model is extensible.

11. The method of claim 7, further comprising adding additional high level content models.

12. The method of claim 7, wherein the data engine is chosen from the group consisting of relational database management systems, object oriented database management systems, object-relational database management systems and XML data repositories.

13. A method of managing a multimedia content management system comprising a multimedia content management object including multimedia object components and multimedia object attributes, said multimedia content management object represented as an item in a relational database adapted for representing multimedia content management data in one or more relational database tables, each of said relational database tables having at least one row with a plurality of columns, said method comprising:

associating a root component of the content management object with a row in a first relational database table;

associating attributes of the root component with corresponding columns of the first relational database table;

associating additional components of the content management object, if any, with rows in additional relational database tables; and using the item defined by the relational database tables to construct a plurality of high level content management data models, each corresponding to a different application.

14. The method of claim 13, wherein each of the additional components comprises a child component of a root component or a child component of another component.

15. The method of claim 14, further comprising using a foreign key in a child component to reference its parent component.

16. The method of claim 13, wherein an attribute comprises a pointer to a data resource stored in a separate repository.

17. The method of claim 13, wherein an attribute comprises a pointer to another content management object.

18. The method of claim 13, wherein a row in another table comprises a link between a source item and a target item.

19. A system for managing and delivering one or more multimedia data object items of a multimedia content management object from a multimedia data object content repository through a multimedia data object content server to a client, each of the multimedia data object items comprising multimedia data object attributes and components, and wherein the multimedia data object content server is controlled and configured to:
   a. associate a root component of the content management object with a row in a first relational database table;
   b. associate attributes of the root component with corresponding columns of the first relational database table; and
   c. associate additional components of the content management object, if any, with corresponding rows in additional relational database tables;
   wherein the data object items are used to construct a plurality of high level data models, each corresponding to a different application.

20. The system of claim 19 wherein, each of the additional components comprises a child component of the root component, or a child component of another child component.

21. The system of claim 20, wherein a foreign key is used in a child component to reference its parent component.

22. The system of claim 19, wherein an attribute comprises a pointer to a data resource stored in a separate repository.

23. The system of claim 19, wherein an attribute comprises a pointer to another content management object.

24. The system of claim 19, wherein a row in another table comprises a link between a source item and a target item.

25. A program product comprising computer readable code on one or more media, said program code being capable of controlling and configuring a computer system having one or more computers to manage a multimedia content management system having a high level content model and a low level physical model of multimedia content data, said low level physical model providing a mapping to a data engine, by representing a multimedia content management object in a database by the method comprising:
   a. entering multimedia content data metadata and schema in the low level physical model, and
   b. mapping the metadata and schema to the data engine, wherein the low level physical model supports a plurality of high level content models, and wherein the high level content models each corresponds to a different application.

26. The program product of claim 25, wherein the high level content model comprises an application program interface embodying a representation of one or more data structures and constraints.

27. The program product of claim 25, wherein the high level content model supports a plurality of content application requirements.

28. The program product of claim 25, wherein the low level physical model is extensible.

29. The program product of claim 25, wherein the low level physical model supports additional high level content models.

30. The program product of claim 25, wherein the data engine is chosen from the group consisting of relational database management systems, object oriented database management systems, object-relational database management systems, and XML data repositones.

31. A program product comprising computer readable code on one or more media, said program code being capable of controlling and configuring a computer system having one or more computers to manage a multimedia content management system comprising a multimedia content management object having multimedia object components and multimedia object attributes, said multimedia content management object represented as an item in a relational database adapted for representing multimedia content management data in one or more relational database tables, each of said relational database tables having at least one row with a plurality of columns, by a method comprising:

associating a root component of the content management object with a row in a first relational database table;

associating attributes of the root component with corresponding columns of the first relational database table;

associating additional components of the content management object, if any, with rows in additional relational database tables; and using the item defined by the relational database tables to construct a plurality of high level data models, each corresponding to a different application.

32. The program product of claim 31, wherein each of the additional components comprises a child component of the root component or a child component of another child component.

33. The program product of claim 32, further comprising program code to direct the computer system to use a foreign key in a child component to reference its parent component.

34. The program product of claim 31, wherein an attribute comprises a pointer to a data resource stored in a separate repository.

35. The program product of claim 31, further comprising program code for populating a multimedia content management system with content schema and metadata, said program code adapted to configure and control the computer to
   a. present a query to a user as to a content item;
   b. based upon the end user's response, present a subsequent query as to the content item;
   c. based upon the end user's further responses, determine the sub-components and attributes of the item.

36. A method of populating a multimedia content management system with content schema and metadata, said content management system comprising a multimedia content management object having multimedia object components and multimedia object attributes, and a relational database adapted for representing component and attribute data in one or more relational database tables, each of said relational database tables having at least one row with a plurality of columns, said method comprising:

presenting a query to a user as to a content item;

based upon the end user's response, presenting a subsequent query as to the content item;

based upon the end user's further responses, determining the components and attributes of the content item;

associating each component of the content item with a row in a separate relational database table; and associating attributes of the content item with corresponding columns of the relational database tables, wherein the content item is suitable for constructing a plurality of high level content management data models, each corresponding to a different application.

37. The method of claim 36, further comprising using a foreign key in a child component to reference its parent component.

38. The method of claim 36, wherein a sub-component comprises a child component of a root component or a child component of another child component.

39. The method of claim 36, wherein an attribute comprises a pointer to a data repository where the component is stored.

40. The method of claim 36, wherein an attribute comprises a pointer to a data resource stored in a separate repository.

41. The method of claim 36, wherein a row in another table comprises a link between a source item and a target item.

* * * * *